United States Patent [19]

Johnson

[11] Patent Number: 4,886,343

[45] Date of Patent: Dec. 12, 1989

[54] APPARATUS AND METHOD FOR ADDITIVE/SUBTRACTIVE PIXEL ARRANGEMENT IN COLOR MOSAIC DISPLAYS

[75] Inventor: Michael J. Johnson, Phoenix, Ariz.

[73] Assignee: Honeywell Inc., Minneapolis, Minn.

[21] Appl. No.: 211,827

[22] Filed: Jun. 20, 1988

[51] Int. Cl.⁴ .............................................. G02F 1/13
[52] U.S. Cl. .................................. 350/335; 350/333; 350/339 F; 350/349; 340/765; 340/784
[58] Field of Search ............... 350/335, 339 F, 337, 350/349, 333; 340/765, 784, 805

[56] References Cited

U.S. PATENT DOCUMENTS

| | | | |
|---|---|---|---|
| 3,703,329 | 11/1972 | Castellano | 350/349 |
| 4,241,339 | 12/1980 | Ushiyama | 350/335 X |
| 4,580,876 | 4/1986 | Stolov et al. | 350/335 X |
| 4,600,274 | 7/1986 | Morozumi | 350/339 F |
| 4,610,507 | 9/1986 | Kamamori et al. | 350/335 |
| 4,659,182 | 4/1987 | Aizawa | 350/335 X |
| 4,770,500 | 9/1988 | Kalmanash et al. | 350/335 X |
| 4,772,885 | 9/1988 | Uehara et al. | 340/784 |
| 4,793,691 | 12/1988 | Enomoto et al. | 350/339 F |
| 4,799,050 | 1/1989 | Prince et al. | 340/765 |
| 4,811,003 | 3/1989 | Strathman et al. | 340/784 X |

Primary Examiner—Stanley D. Miller
Assistant Examiner—Richard Gallivan
Attorney, Agent, or Firm—John G. Shudy, Jr.

[57] ABSTRACT

A liquid crystal display unit is described in which a first panel of pixel elements is used to control red and green portions of a displayed image using an additive technique while a second panel, having pixels aligned with the first panel pixels, controls the blue portion of the image through subtractive techniques. The resulting display system can provide enhanced brightness, resolution and color characteristics. The display system makes use of the fact that the eye is less sensitive to blue radiation for several visual parameters. As a result of the decreased sensitivity, the second (blue) panel can operate with less stringent requirements.

20 Claims, 9 Drawing Sheets

| RED/BLUE | GRN/BLUE | BLUE CONTROL | OUTPUT COLOR |
|---|---|---|---|
| OFF | OFF | X | BLACK |
| OFF | ON | −BLUE | GREEN |
| ON | OFF | −BLUE | RED |
| ON | ON | −BLUE | YELLOW |
| OFF | ON | PASS BL | CYAN |
| ON | OFF | PASS BL | MAGENTA |
| ON | ON | PASS BL | WHITE |

APPARATUS AND METHOD FOR ADDITIVE/SUBTRACTIVE PIXEL ARRANGEMENT IN COLOR MOSAIC DISPLAYS

RELATED APPLICATION

The invention described herein is related to U.S. patent application Ser. No. 07/178,949 filed on Apr. 7, 1988, entitled APPARATUS AND METHOD FOR AN ELECTRONICALLY CONTROLLED COLOR FILTER FOR USE IN INFORMATION DISPLAY APPLICATION, invented by L. D. Silverstein and A. J. Bernot and assigned to the assignee of the present application.

BACKGROUND OF THE INVENTION

1. Field of the Invention

This invention relates generally to flat panel color displays and, more particularly, to displays in which the image is the result of a mosaic of pixel regions.

2. Description of the Related Art

Liquid crystal mosaic display technology is being developed as a possible successor to color cathode ray tubes (CRTs) in many display applications, including those applications in the avionics field. This technology offers important advantages such as higher reliability along with reduced power, size and weight. But in the current state of development of the liquid crystal technology, capability of this technology for the rendering of an image falls short of the image capability achievable using CRT technology. This invention addresses three specific problem areas still remaining in liquid crystal mosaic displays: color definition; image resolution; and display brightness. In terms of color definition, the liquid crystal mosaic display color rendition suffers from effects similar to those observed on a misaligned CRT display tube. The primary hues, the red, green and blue colors, do not blend properly. A white line, for example, appears to have multicolored fringes, symptomatic of deficient color synthesis. Part of the problem can be attributed to the symbol generator which controls the formation of graphics on the flat panel. However, part of the problem can also be attributed to the display itself, a contribution addressed by this invention.

Figure 1A:
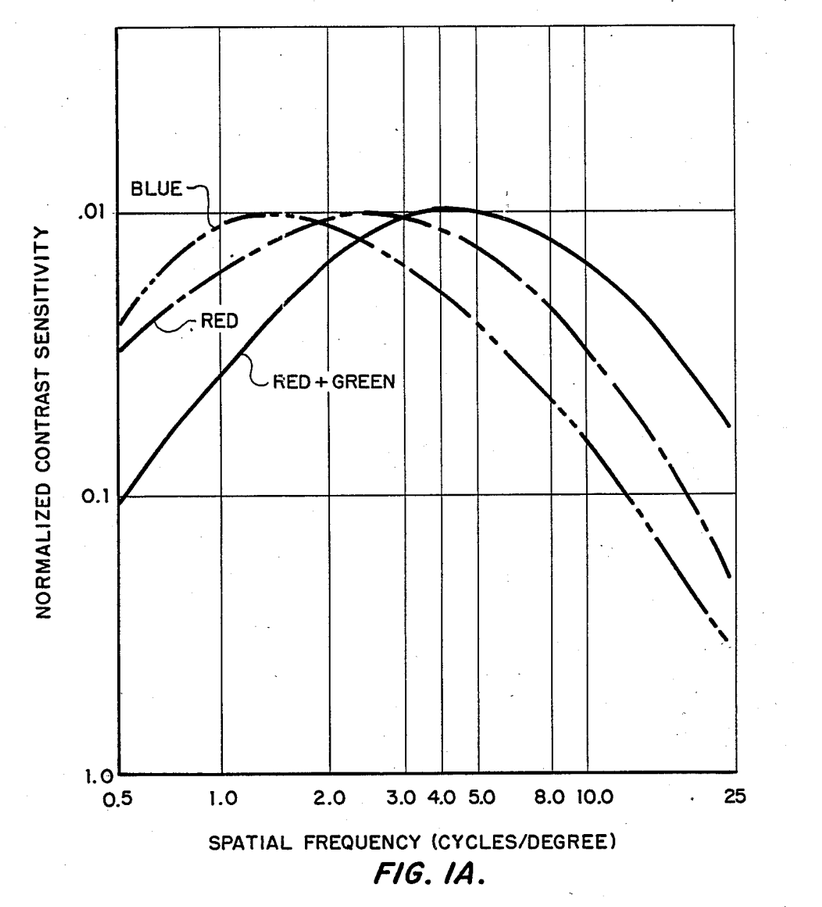
FIG. 1A illustrates the eye's lower spatial frequency for blue as compared to other primary colors.

In terms of image resolution, graphic symbols and lines appear excessively jagged or discontinuous on color mosaic displays, especially when compared with lines drawn on calligraphic color CRT systems. Again part of the image resolution problem can be attributed to the symbol generator while the display panel itself also provides a contribution. A major part of the contribution from the display panel is the result of the presence of blue pixels as part of the display pixel mosaic. Referring now to FIG. 1A, the low degree of spatial sensitivity that the human visual system has for blue light as compared to the other primary colors is illustrated. The eye's peak response to blue light occurs at about one half the frequency of peak response for the red radiation and half again the frequency for green radiation. This result indicates that blue radiation contributes only a minor amount to image shape and spatial detail. As a result, blue pixels on the display surface of the panel tend to degrade the overall resolution capability of color mosaic displays, a feature addressed by the present invention.

With respect to display brightness, the origin of the problem can be attributed to both the pixel arrangement of the panel and the current backlight technology used in liquid crystal displays. The backlight technology includes the lamp and the electronics controlling the backlight lamp. The chief figure of merit for achieving a given level of brightness is how much power is needed to achieve that brightness level. Research is being aggressively pursued to make backlight technology more efficient.

Figure 1B:
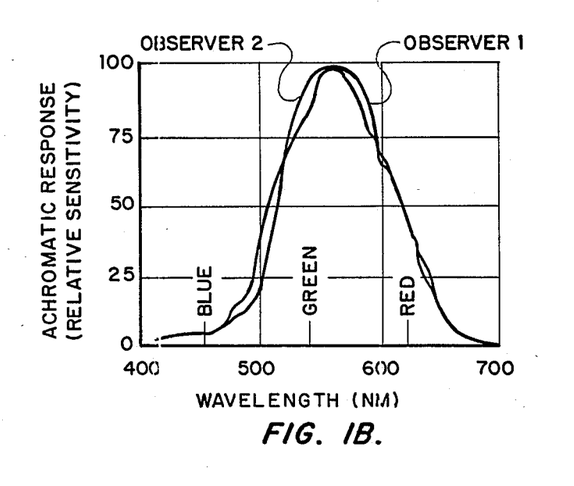
FIG. 1B illustrates the reduced sensitivity to blue radiation as compared to radiation of the other primary colors.

The present invention, however, addresses the brightness problem from a different perspective. Once again, the pixel arrangement on the surface of the flat panel display can account for a considerable portion of the problem. Blue pixels contribute little to the total perceived luminance of the panel display. The photopic response of the eye accounts for this phenomenon. FIG. 1B illustrates that red and green radiation provide a larger contribution to perceived brightness than blue radiation. Blue radiation can typically provide only about a ten percent contribution to the overall brightness of the panel.

Figure 2:
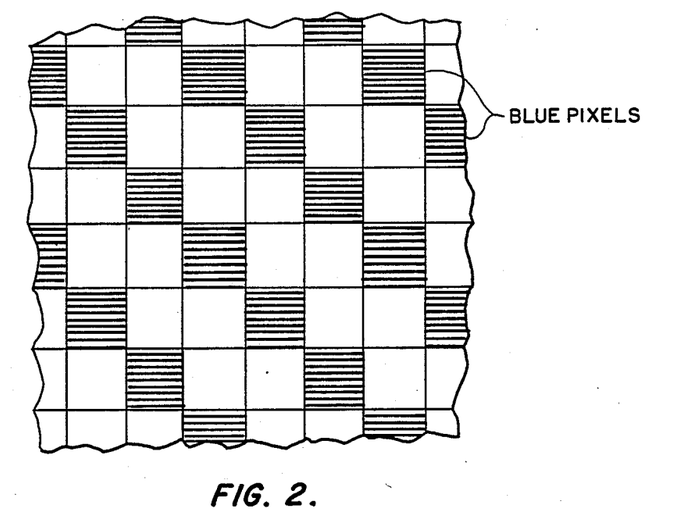
FIG. 2 illustrates the regions (blue pixels) that do not contribute to the mosaic display luminance.

Referring next to FIG. 2, the effect of having blue pixels occupying space in the pixel arrangement is shown. Wherever a blue pixel is present, the effect on the pattern of pixels is to occlude the perceivable luminance passing through the display surface. No appreciable contribution to luminance capability is available at the sites of the blue pixels. As a result, these blue pixel regions of FIG. 2 can be considered as black regions. These regions occupy thirty percent of useful area in a typical Red/Green/Blue (RGB) pixel mosaic arrangement.

In order to compete successfully with the cathode ray tube technology in a multiplicity of applications, the liquid crystal mosaic displays must evolve to the point where they efficiently achieve enough brightness to prevent bright sunshine from washing out displayed information. Additionally, they must also exhibit higher resolution and improved color mixture attributes for higher quality imagery to be displayed. Achieving these goals has proven difficult in the past.

A wide range of techniques have been implemented in flat panel display technology to alleviate the problems described above. Listed below is a description of the principal approaches for solving color definition, image resolution and display brightness problems in the liquid crystal mosaic displays.

Figure 3:
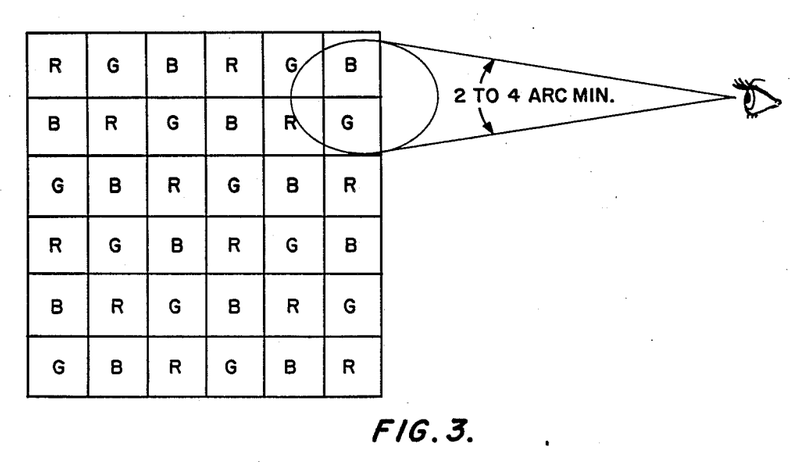
FIG. 3 illustrates how the eye integrates neighboring pixels to provide a full color spectrum from primary hues.

Generally, color image synthesis in liquid crystal mosaic displays use either additive or subtractive techniques (cf. the above identified related application). Additive techniques use spatial proximity, temporal superposition or spatial superposition techniques to mix primary hues into different colors. Additive spatial proximity methods are the most common approach used in liquid crystal flat panel technology. FIG. 3 illustrates the basic technique of spatial proximity. Small dots (pixels) of primary colors, typically red, green and blue, are evenly dispersed across the surface of the flat panel display. If the dots (pixels) are small enough and close enough, then the eye fuses or integrates the contribution of each color dot together with its neighbors. The additive method can achieve enhanced resolution by making the pixels smaller and more densely packed. Additionally, the differently colored pixels can be arranged into different patterns, in hopes of striking a better fit with the characteristics of the human visual system. Full color imagery is therefore perceived. Excellent resolution can result because each pixel is capable of full color control and full luminance control. Additive spatial proximity, the method generally preferred throughout the industry, suffers three serious drawbacks, outlined above in the problem discussion. Color definition is faulty in the case of computer generated imagery (unless signal processing methods are used) resulting in color fringing and rainbows effects. As the pixels are made smaller, color integration is improved but light output is worsened because a greater percentage of the primary display area gets consumed by address lines and interconnecting conductors. In addition, blue contributes very little to perceived brightness yet consumes typically one quarter to one third the active display area as indicated previously. Blue also detracts from resolution capability, limiting edge definition and image sharpness. The three principal problems with this approach then are: (1) poor color integration and (2) wasted luminance and (3) wasted resolution.

Figure 4A:
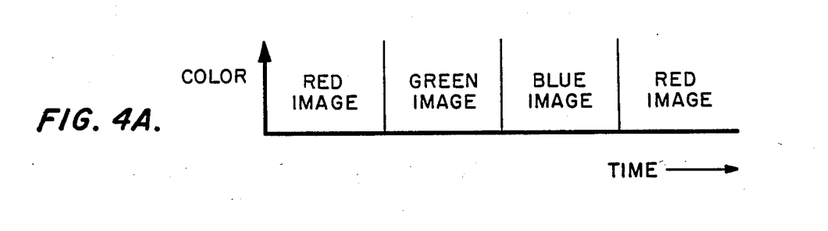
FIG. 4A and FIG. 4B illustrate temporal integration of a sequence of primary color images to provide a complete image.
Figure 4B:
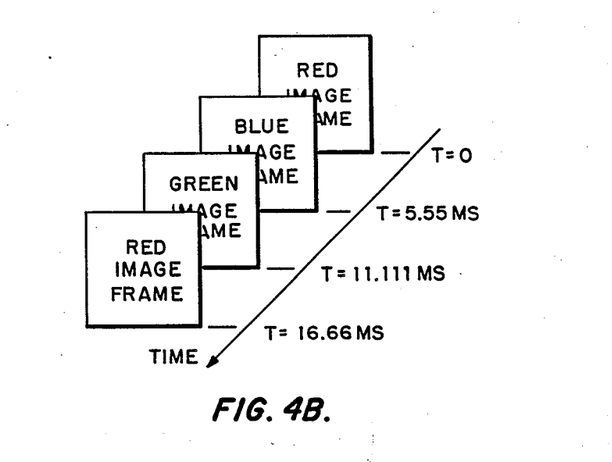

In additive temporal superposition methods, the primary hues are rapidly sequenced before the eye. FIG. 4 shows one possible sequence. First, the red portion of the image is flashed on the flat panel display, then the green portion of the image is flashed on the flat panel display and, a short time later, the blue portion of the image is flashed on the flat panel display. Successful color synthesis using this temporal additive technique depends on the limited temporal frequency response of human vision. If the sequencing occurs rapidly enough, the eye cannot discern the separate primary hues, but, instead, perceives their overall integrated image. Temporal superposition suffers from smearing effects, jitter and image instability as the observer shifts his viewing position rapidly or vibration induces similar motion. In addition, todays liquid crystal materials exhibit such slow optical response times, rapid temporal sequencing using them is virtually impossible.

Figure 5:
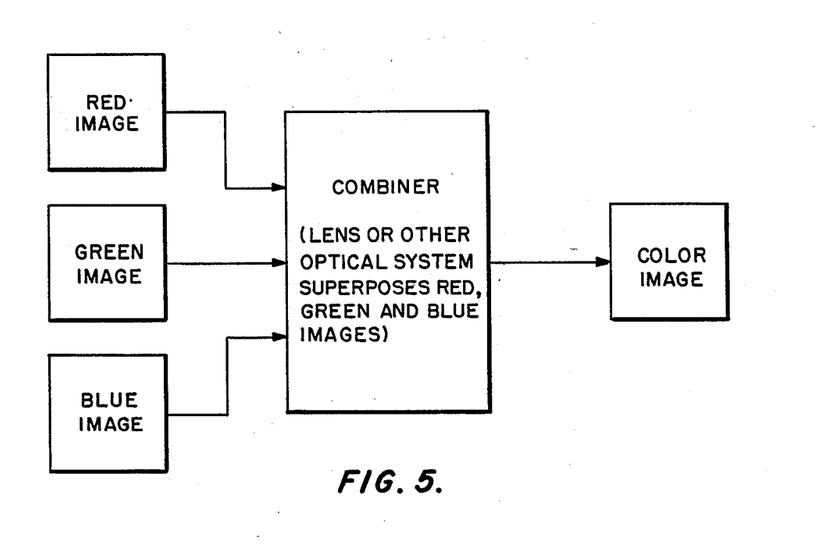
FIG. 5 is a block diagram illustrating the development of an image using spatial superposition of image portions.

In additive spatial superposition methods, separate images, each comprised of only one primary hue, are optically fused into one full color image. Typically three images, corresponding to red, green and blue hues, are used. These separate images are formed from three separate image sources. The output images of these three sources are then fused by optics into one full color image to be viewed by the observer (cf. FIG. 5). Excellent resolution is typical of this approach because each pixel is capable of full color and full luminance control. Brightness can also be high since three image forming sources are operated in parallel. Additive spatial superposition techniques suffer from complexity problems and performance difficulties. These systems also tend to be prohibitively large for many applications, especially those of the aerospace market. Cost generally rises due to the fact that three separate imaging devices are needed. Then additional hardware must be used to combine the three images. Frequently, this hardware must be extremely precise and rigid to maintain color purity.

Figure 6:
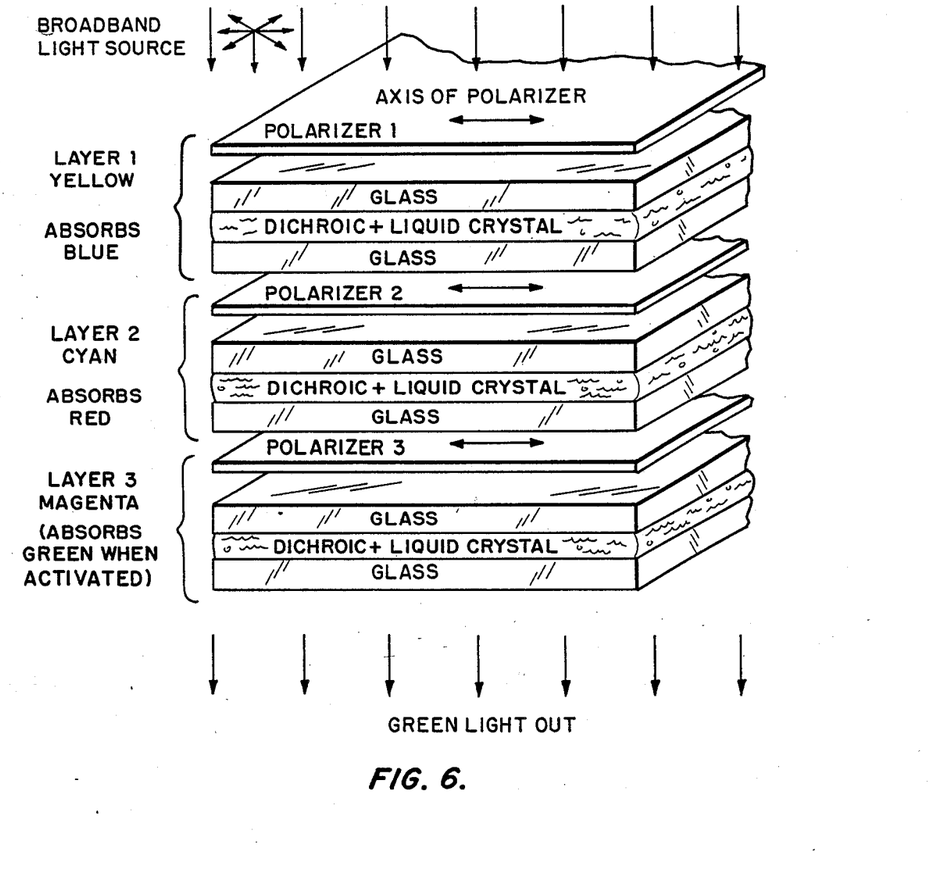
FIG. 6 illustrates a controllable filter for creating a color image by removing selected portion of broad band optical transmission passing therethrough.

In subtractive display apparatus (illustrated in FIG. 6), white (broad band) radiation is passed through successive layers of complimentary color filters, each layer being electrically controlled for absorbing a well-defined region of the spectrum. By modulating the voltage applied to each layer, different portions of the white light spectrum can be occluded or, in the alternative, be allowed to pass through unimpeded. This spectral control, the ability to withdraw selectively different portions of the spectrum, can be used to synthesize full color imagery. Resolution can be excellent with this approach because full color control is available at the site of each pixel. Subtractive methods suffer from an expected higher cost, parallax effects and complex methods for color control. At least three and possibly four separate liquid crystal panels are needed to make a subtractive superpositional liquid crystal display. Currently, this additional complexity is viewed as too costly. In addition, parallax can be troublesome using this technique. As the viewing angle is changed with respect to the display, each layer of pixels in the panel is viewed from a slightly different position. Pixels on different layers of the display will be observed to move with respect to each other. Lines can vary substantially in perceived thickness, due to head motion alone. Effects such as these, which are functions of viewing angle, are unacceptable for many (e.g., aerospace) applications. Finally, color control has proven to be particularly troublesome to date. Experiments indicate that, unless better dyes, backlighting or even a fourth layer can be developed, colors cannot be tracked over a broad range of ambient lighting conditions. The difficulty lies in the complex interrelationships between hue and luminance. One interferes with the other in a non-linear manner which currently has proven very difficult to predict.

A need has therefore been felt for a liquid crystal display unit that provides increased display brightness, increased image resolution and better color reproduction.

FEATURES OF THE INVENTION

It is an object of the present invention to provide an improved color display device.

It is a feature of the present invention to provide an improved flat-panel mosaic display device.

It is a further feature of the present invention to provide for green and red color components by spatial proximity of pixels while the blue color component is provided by pixel subtraction.

It is another feature of the present invention to provide a mosaic display device in which a first panel transmitting red and green light through a mosaic of pixels have a second panel aligned therewith through which blue light is transmitted in a mosaic of pixels.

SUMMARY OF THE INVENTION

The aforementioned and other features are accomplished, according to the present invention, by providing a liquid crystal display system in which a first panel has liquid crystal pixel elements that control the transmission of red and green image components and a second panel, aligned with the first panel for which liquid crystal pixel elements control the transmission blue image components therethrough. The first panel controls the red and green color components by additive spatial proximity techniques. The second panel controls the blue image component by subtractive techniques. Because of the reduced sensitivity of the eye to blue color components, the pixel array of the second panel can have diminished resolution and can have a diminished refresh rate compared to the first panel.

These and other features of the invention will be understood upon reading of the following description along with the drawings.

DESCRIPTION OF THE PREFERRED EMBODIMENT

1. Detailed Description of the Figures

Figure 7:
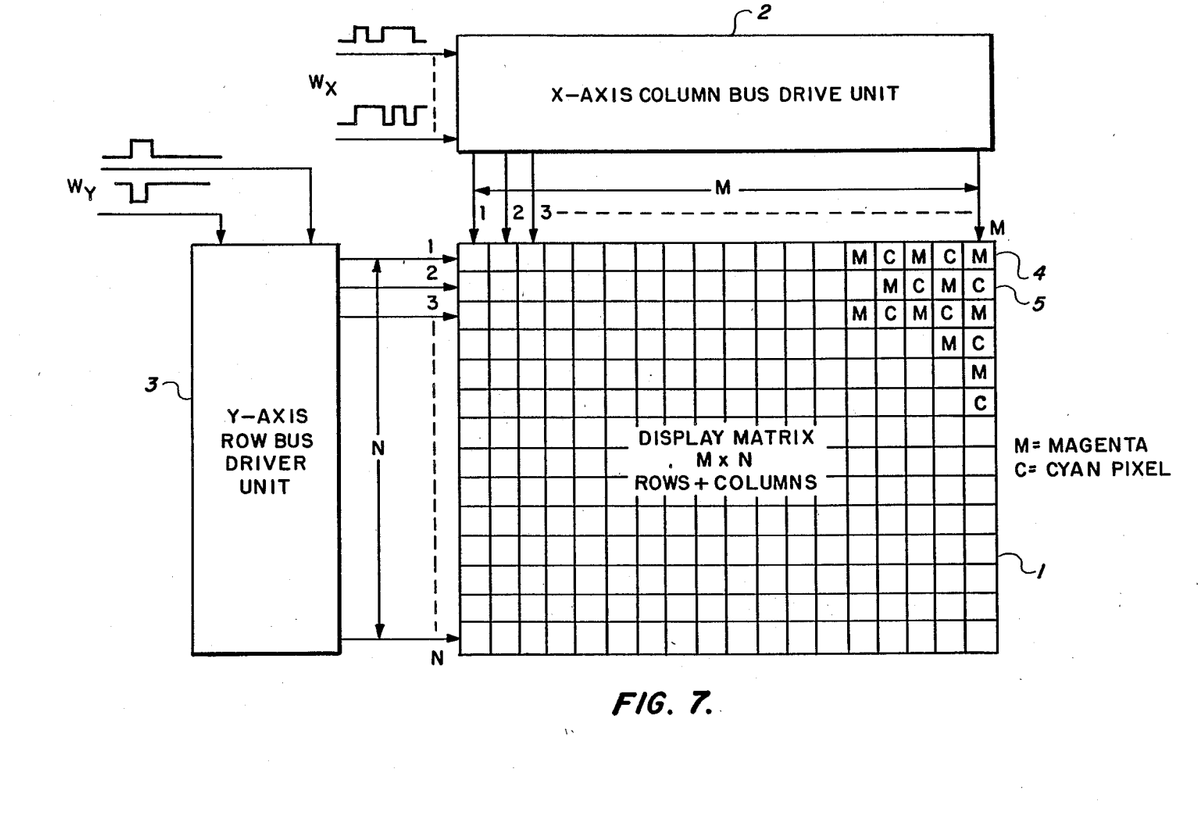
FIG. 7 is a schematic diagram of a first panel of an additive/subtractive display panel of the present invention.

Referring now to FIG. 7, a first panel 1 of the additive/subtractive display is shown. The liquid crystal display has an MxN matrix of pixels, each pixel being addressed by one of M column conductors and one of N row conductors. The M column conductors are selected by x-axis column bus drive unit 2 in response to groups of address signals, Wx, and the N row conductors are selected by y-row bus drive unit 3 in response to groups of address signals, Wy. The intersection of activated column conductors and an activated row conductor activates the associated pixels along the row. Either active matrix methods or multiplexing methods can be used to activate the pixels, techniques known in the related art. In the active matrix approach, active devices such as thin film transistors or metal insulator metal diodes are used as switching or non-linear devices to control the storage of charge across each pixel. In multiplexing methods, no active device is present. The relationships of voltage signals on row bus lines with respect to voltages present on column bus lines controls charge storage across each pixel which in turn controls the state of the pixel (liquid crystal) optically active material. This method depends on the sharp electro-optical threshold of the liquid crystal material itself rather than on the threshold behavior of intervening electronic devices used in active matrices.

Figures 8A, 8B:
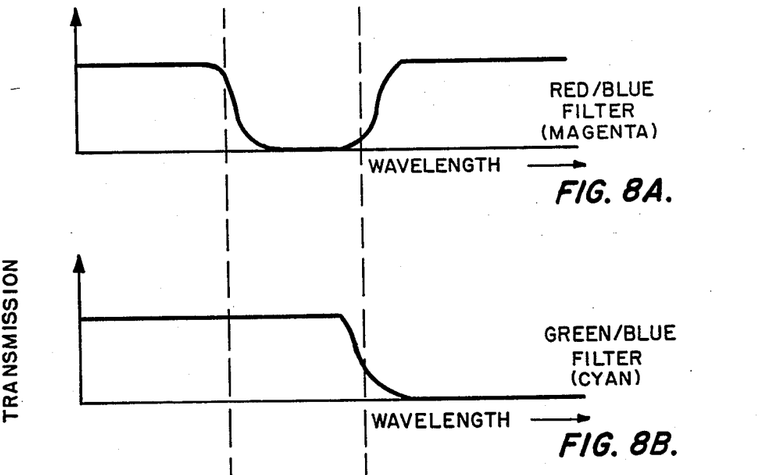
FIG. 8A illustrates the passband characteristics of a magenta filter.
FIG. 8B shows the passband characteristics of a cyan filter; and 8C illustrates the passband characteristics of dichroic filter for transmitting blue light.

Still referring to FIG. 7, the color pixel arrangement of the top layer of the additive subtractive display is illustrated. Pixels of one complimentary primary hue, (magenta filter) pixel 4, for example, are distributed in a checkerboard pattern with pixels of another complimentary primary hue (cyan filter) pixel 5. The checkerboard pattern is used by way of example and is not meant to be limiting. The optical passband characteristics of the magenta and cyan filters are shown in FIG. 8A and 8B. No blue primary hue pixels are present in the pixel pattern of the top surface. The use of only magenta and cyan filter pixels leads to the resolution and brightness advantages described earlier in the disclosure.

Figure 9:
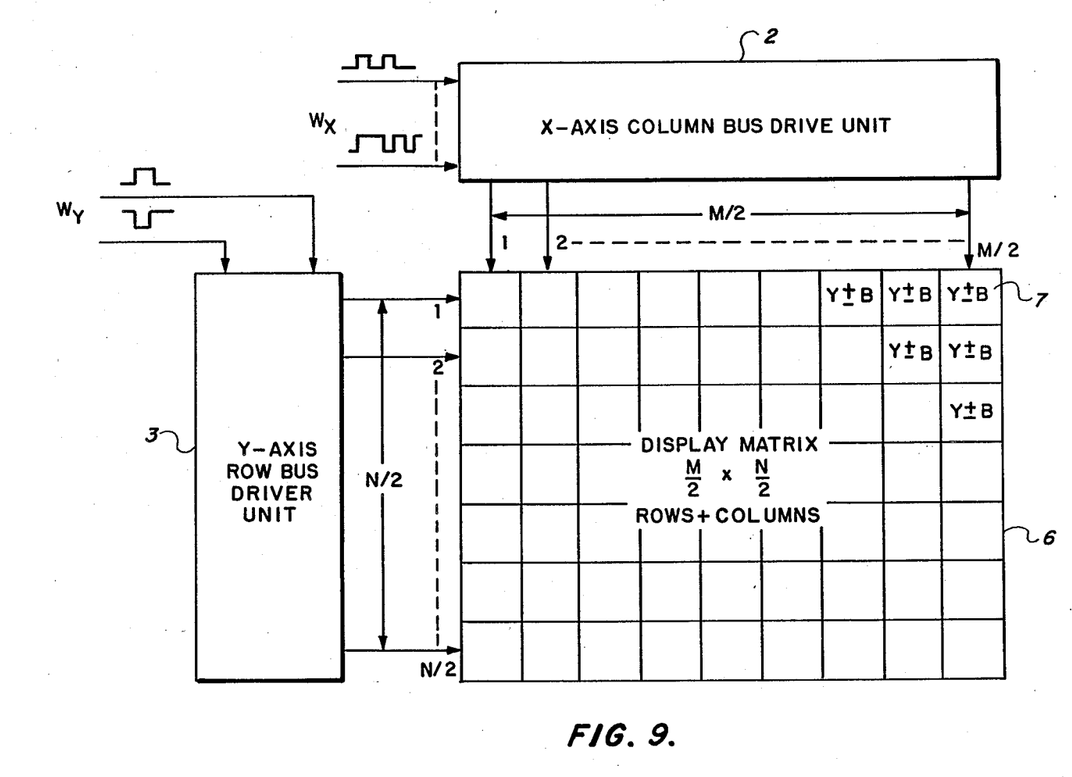
FIG. 9 is a schematic diagram of a second panel of the additive/subtractive display of the present invention.

Referring next to FIG. 9, the second panel 6 of the additive/subtractive display is shown. The matrix is shown with half the number (M/2×N/2) of rows and columns used in the first panel 1. This degraded resolution is possible because of the lower spatial resolution capability human vision has for blue light modulation as compared to red and green light modulation. Except for this spatial resolution difference, the drive units and address waveforms used for second panel 6 can be identical to those used for the first panel 1. Another difference is possible, however. The refresh rate of images displayed on the second panel 6 can be lowered relative to the refresh rate of the first panel 1 because human vision is less sensitive to blue light in terms of temporal resolution as well as spatial resolution. When red/green images are displayed on a display device whose images decay with time, the red/green images need to be refreshed periodically at a typical frequency of 60 Hz. This critical fusion frequency allows the eye to integrate the flashing images into a steady scene absent of flicker or image decay. Blue light images can be seen without flicker at much lower refresh frequencies, 10 Hz for example. This phenomenon can be used to have the overall effect of lowering the drive requirements for the blue color portion of the system.

Figure 8C:
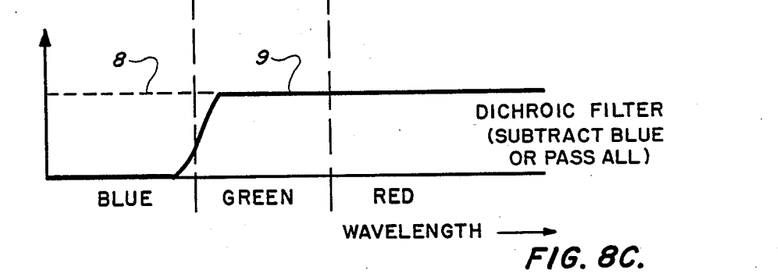

Still referring to FIG. 9, the color pixel arrangement of the bottom layer 6 is shown. Each pixel 7 controls the passage of blue light through the display. Each pixel can block blue light from passing through or, alternatively, can be energized so blue light can pass through unimpeded. In order to accomplish this, a guest host dichroic liquid crystal material (Merck ZLI2010 for example) is used. The passband characteristics of this liquid crystal material are shown in FIG. 8c. The passband spectral characteristic is variable and is a function of applied voltage. If voltage of one value is applied, then the passband is 9 as shown by FIG. 8c. No blue light is allowed to be transmitted. Other spectral components (red and green), however, can pass through freely, giving this filter a yellow hue when placed before a broad band light source (white light). When, on the other hand, another appropriate voltage is applied, then all wavelengths, including blue, are allowed to pass freely through the dichroic material. The passband is shown by dotted line 8 plus solid line 9 in FIG. 8c. Therefore, if the second panel 6 is placed before a broad band (white) light source and all the pixels are activated with the appropriate voltage, then the light passed through the second panel 6 appears blue-white instead of yellow. To obtain white, one half the pixels in the lower layer are activated. This activation provides an improved balance of the blue contribution to the overall spectral output. The ability of the bottom layer 6 to modulate blue light on a pixel by pixel basis, yet pass other spectral components is used together with the first panel 1 to produce full color images.

Figure 10:
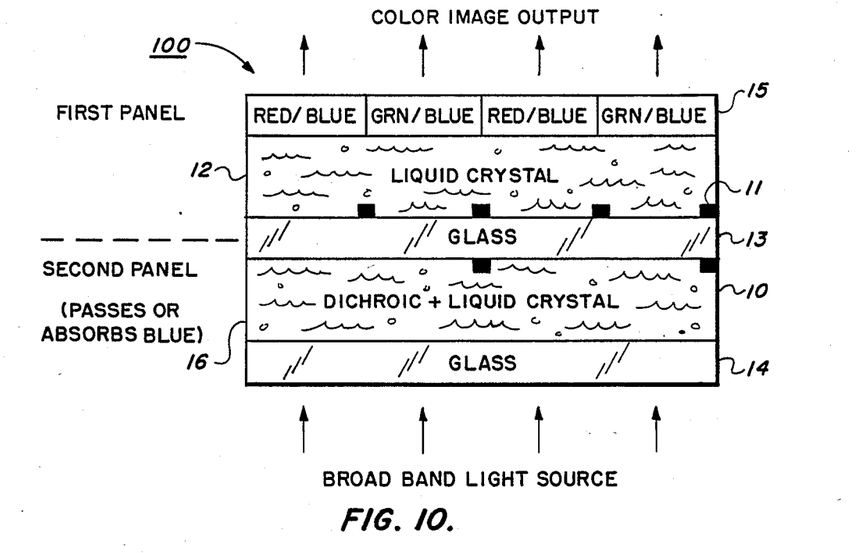
FIG. 10 is a cross-sectional view of the additive/subtractive display system according to the present invention.

Referring next to FIG. 10, the cross section of a total additive/subtractive display unit 100 incorporating both the first panel 1 (of FIG. 7) and the second panel 6 (of FIG. 9) is shown. The additive/subtractive display unit 100 includes a glass plate 14 and a glass plate 13 which enclose a region 16 containing dichroic material combined with a liquid crystal material. The glass plate 13 and filter plate 15, which includes a mosaic of magenta and cyan filters, enclose a region 12 containing a liquid crystal. Pixel control devices 10 in region 16 and pixel control devices 11 in region 12 are also shown. These pixel control devices 10 and 11 can be active matrix control devices (thin film transistors or metal/insulator/metal diodes for example) or, alternatively, can represent the intersection points of the row/column electrodes of multiplexed display technology described above. The blue control devices 10 are shown with twice the spacing and, therefore, half the resolution of the red/green control devices 11. This reduced element spacing reflects the physical differences of human vision resolution for resolving colors described previously. Alternatively, the resolution of the second panel 6 can be identical to that of the first panel 1. This configuration has the effect of adding a higher degree of fault tolerance capability in addition to increased blue light resolution capability. Several blue panel control devices and their associated blue pixels can be activated simultaneously in this configuration to cover the same area as a lower resolution blue control pixel. Therefore, some measure of redundancy or immunity to local failure can be achieved. The blue panel control devices 10 provide control over each pixel, enabling the additive/subtractive display to control the passage of blue light over the area of each cell or pixel 7 of FIG. 9 in the matrix of the second panel 6. Each pixel can either permit white light or yellow light to pass through the second panel 6 to the first panel 1. The red/green control devices 11 control the passage of light through the top layer 1. The red/green control devices determine whether any light is free to pass through the red-blue (magenta) 4 and green-blue (cyan) 5 filters located on the color filter surface of the top panel 1. Consequently, this layer not only controls hue but, significantly, controls brightness. Each pixel can be controlled to render gray shades as well as hue. This capability builds on the advantageous methods for rendering gray shades established by additive technology and avoids the distinctly complex luminance/chrominance interrelationships manifest in subtractive technology, alone.

Figure 11:
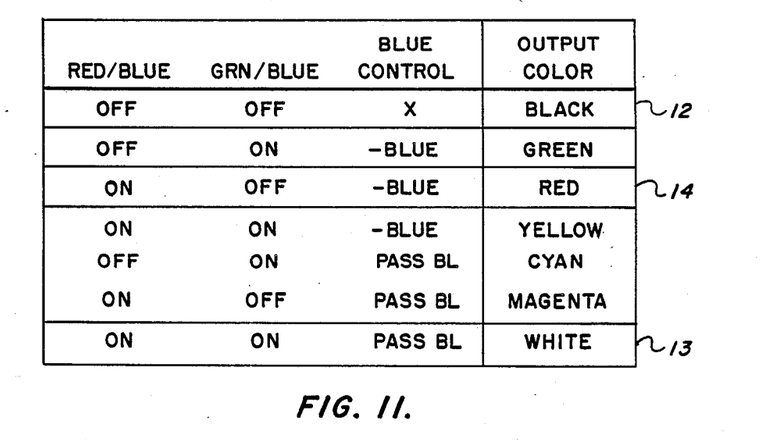
FIG. 11 is a table illustrating the colors available with the additive/subtractive display panel of FIG. 10.

Referring next to FIG. 11, the operating conditions of pixels in each panel needed to produce the display colors listed is shown. For example, if a black pixel 12 is desired, then the condition of the second panel 6 is inconsequential because any light passing through this panel will be blocked by the off condition of the magenta and cyan pixels in the first panel 1. If a white region 13 is desired, then one half of the pixels of the second panel 6 must be in the pass "yellow plus blue" (white) state and the magenta 4 and cyan 5 pixels in first panel 1 must be fully ON. Although the panel in actuality produces only discrete magenta and cyan pixels in this state, the eye fuses them into white because of the close proximity of these hues. For this fusion to be successful, the pixels must be small enough and close enough to fall within the integration zone of the eye. In order to produce a red region 14, the second panel 6 must be placed in the yellow or minus blue state 9 shown in FIG. 8. The magenta pixels 4 in the first panel 1 must be ON and the cyan pixels 5 in the desired region must be placed in the OFF state.

Figure 12:
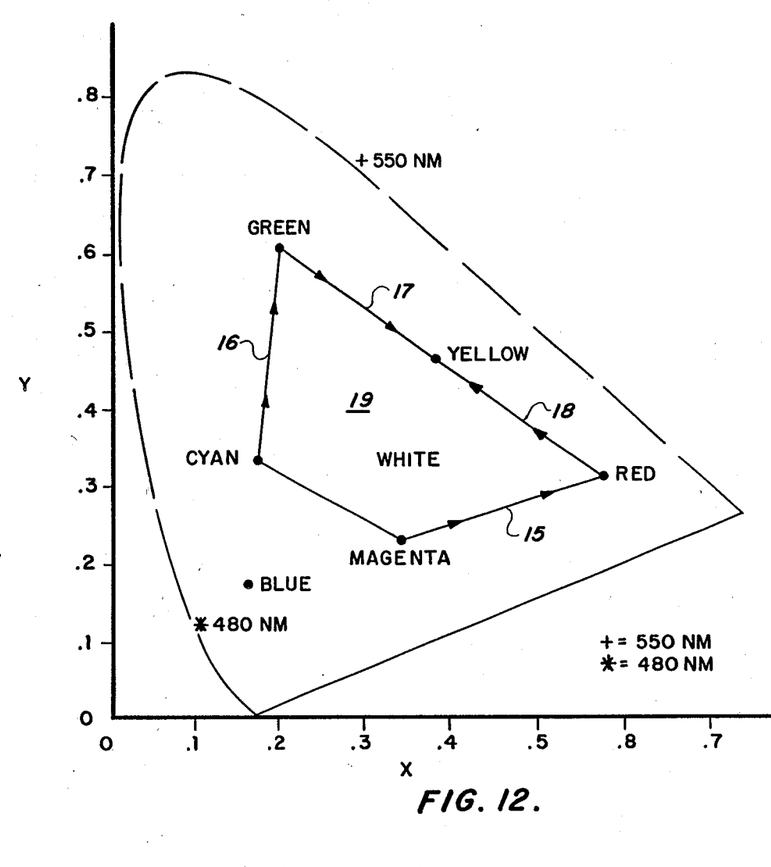
FIG. 12 is a CIE diagram illustrating the colors that can be achieved using the additive subtractive display system of the present invention.

Referring next to FIG. 12, a CIE color chart illustrating the range of colors which can be produced by gray level control of all pixels. If the blue control pixels 7 of the second panel 6 are varied from the pass blue state 8 plus 9 (all wavelengths are passed yielding white) to the block blue state 9, then each magenta pixel 4 moves from the magenta state to red along line 15 and each cyan pixel 5 moves from cyan to green along line 16 shown in FIG. 12. If blue is blocked entirely by pixels on layer 6, and if the cyan pixels 5 are ON and the magenta pixels are varied along a continuum from OFF to ON, then colors along line segment 17 will be produced, ending in yellow when the resultant green and red pixels are finally integrated by the eye. Conversely, if blue is again blocked by the second panel 6, but, this time, the magenta pixels 4 are fully ON and the cyan pixels 5 are varied from OFF to ON, then colors along line segment 18 will be produced. Again the final color is yellow. When all pixels are allowed to vary from one extreme state to the other, all the colors within region 19 can be produced. In addition, by taking advantage of additive methods, luminance can be varied as well. Images can be shaded, shaped and contoured in much the same manner as is used with additive juxtaposition mechanisms. It is the red/green pixels of additive methods which provide the brightness and shape information. Similarly, it is the magenta/cyan pixels of the additive/subtractive display system which provide the same kind of information.

2. Operation of the Preferred Embodiment

The present invention differs from prior art by tailoring the panel in better accord with the human visual system. Specifically, the invention addresses the fact that human vision relies almost exclusively on non-blue light, the red colors and the green colors, for spatial and intensity information. Further, the invention takes into account the fact that the eye uses blue light energy almost exclusively for chromatic information alone. Because blue light contributes very little to spatial detail and brightness, the invention removes blue light control from the principal display surface and dedicates this surface to the brighter and more resolvable red and green pixels. To achieve a wide range of colors, blue light control is placed behind the principal imaging layer, using techniques developed recently for the subtractive superpositional approach. Together, these two image planes add and subtract light to synthesize higher resolution, higher brightness images with a broad range of colors. The invention combines the simplicity and superior luminance control of one approach (additive juxtaposition) with the resolution enhancement of the second approach (superpositional subtractive).

By taking better advantage of the human visual system, the display system of the present invention produces up to one third more luminance and resolution capability than predominant methods without incurring the volume and complexity cost of the other methods. Blue pixel control, useful for color synthesis, but wasteful for brightness and image sharpness, is relegated to a secondary surface. This control leaves the primary display surface free to display the highly useful red and green pixels. These two display surfaces are sandwiched together into one compact flat panel display. Because imagery is not rapidly sequenced as a function of primary hue, the invention does not suffer from the temporal anomalies of temporal superposition approaches. Because it does not require recombination optics, it has a size advantage over spatial superposition methods. Finally, because it is primarily an additive display and uses only two imaging layers with blue on the secondary layer, it delivers more manageable luminance and color control, less complexity and parallax stability than the subtractive approach.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A liquid crystal display system comprising:
   first panel means for controlling transmission of red and green image components therethrough; and
   second panel means for controlling transmission of blue image components therethrough, said second panel components being aligned with said red and green image components.

2. The liquid crystal display system of claim 1 wherein said first panel means controls said red and green image components by additive spatial proximity techniques and wherein said second panel means controls said blue image components by subtractive techniques.

3. The liquid crystal display system of claim 2 wherein image resolution is determined by said red and green image components.

4. The liquid crystal display system of claim 2 wherein said first panel includes a first plurality of controllable liquid crystal pixel units for controlling transmission of red color components therethrough and wherein said first panel includes a second plurality of controllable liquid crystal pixel units for controlling transmission of green color components therethrough.

5. The liquid crystal display unit of claim 4 wherein said second panel includes a third plurality of controllable liquid crystal pixel units, each of said third plurality of pixel units aligned with a plurality of first panel pixel units.

6. The liquid crystal display unit of claim 5 wherein brightness parameters of an image are controlled by said first panel pixel units.

7. The liquid crystal display unit of claim 6 wherein said first, second and third pluralities of pixel units are controlled using matrix addressing techniques.

8. The method of displaying an image, said method comprising the steps of:
   controllably transmitting blue image components through a second panel in response to white light applied thereto; and
   controllably transmitting red and green image components through a first panel, said second panel receiving light from said second panel.

9. The method of displaying an image of claim 8 wherein said first and said second panel include liquid crystal pixel units, a first plurality of pixel units of said first panel controlling transmission of red image components, a second plurality of pixel units of said first panel controlling transmission of red image components, the method further comprising the step of visually integrating light through proximate red pixel units and green pixel units.

10. The method of displaying an image of claim 9 further comprising the step of controlling transmission of light through pixel units of said first panel by address control networks.

11. The method of displaying an image of claim 10 wherein pixel units of said second panel are at least as large as pixel units of said first panel, said method further comprising the step of aligning said first and said second panel so radiation transmitted through a pixel unit of said second panel is transmitted through a plurality of pixel units of said first panel.

12. The method of displaying an image of claim 11 further comprising the step of controlling a brightness of said image by controlling an amount of radiation transmitted by said first panel.

13. The method of displaying an image of claim 12 further comprising the step of controlling image resolution by a structure of said red and green pixel units.

14. A liquid crystal display system for providing an image, said system comprising:
   a source of optical radiation;
   a second panel including first plurality of pixel units responsive to control signals for transmitting blue color components of said image along with red and green components of said optical radiation; and
   a first panel having a second and third plurality of pixel units responsive to control signals, said second plurality of pixels transmitting blue radiation and red color image components in response to radiation transmitted through said second panel, said third plurality of pixel units transmitting blue radiation and green color image components in response to radiation transmitted through said second panel.

15. The liquid crystal display system of claim 14 wherein a brightness of said image is controlled by radiation through said first panel.

16. The liquid crystal display system of claim 14 wherein said second panel pixel units are at least as large as said first panel pixel units, a second panel pixel unit transmitting radiation transmitted by a plurality of pixel units of said first panel.

17. The liquid crystal display system of claim 16 wherein said second panel includes a dichroic material and a liquid crystal material along with a first plurality of control elements and said first panel includes a liquid crystal material, a mosaic of red/blue and green/blue filters and a first and second plurality of control elements.

18. The liquid crystal display system of claim 17 wherein colors of said image are obtained by combining radiation transmitted through a plurality of proximate first panel pixel units.

19. The liquid crystal display system of claim 18 wherein image resolution is determined by said first panel pixel units.

20. The liquid crystal display system of claim 19 wherein a white color is provided by activating neighboring green and red pixel units.

* * * * *